June 16, 1959

E. A. NORFOLK, JR 2,890,924

VARIABLE SPEED DRIVE

Filed Aug. 31, 1955

INVENTOR.
EDGAR ARTHUR NORFOLK Jr.
BY George Sipkin
B. L. Zangwill
ATTORNEYS

June 16, 1959

E. A. NORFOLK, JR 2,890,924

VARIABLE SPEED DRIVE

Filed Aug. 31. 1955

INVENTOR.
EDGAR ARTHUR NORFOLK Jr.
BY George Sipkin
B. L. Zangwill
ATTORNEYS

June 16, 1959  E. A. NORFOLK, JR  2,890,924
VARIABLE SPEED DRIVE

Filed Aug. 31, 1955  6 Sheets—Sheet 4

INVENTOR.
EDGAR ARTHUR NORFOLK Jr.
BY George Lipkin
B. L. Zangwill
ATTORNEYS

June 16, 1959 E. A. NORFOLK, JR 2,890,924
VARIABLE SPEED DRIVE
Filed Aug. 31, 1955 6 Sheets—Sheet 5
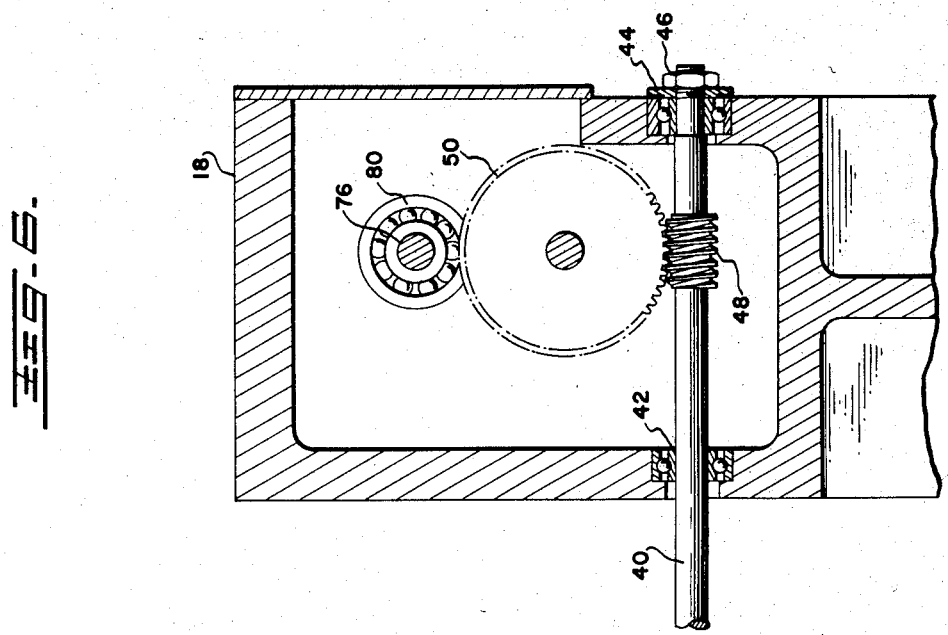
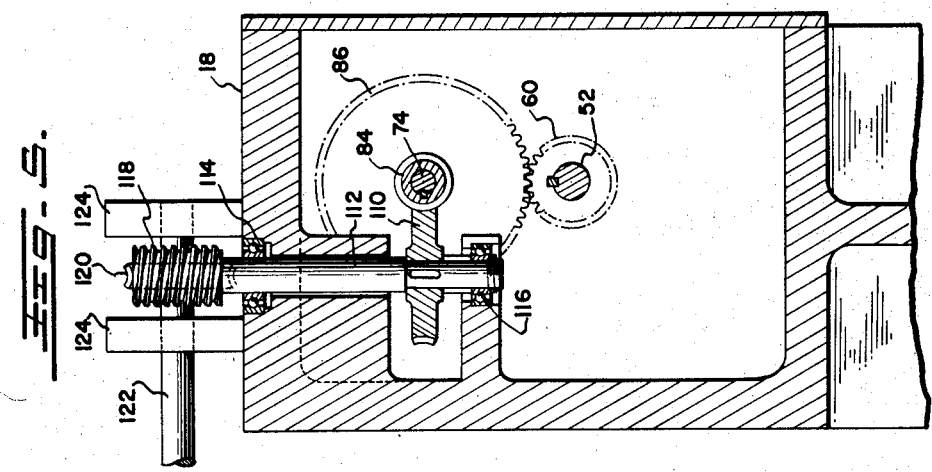
INVENTOR.
EDGAR ARTHUR NORFOLK Jr.
ATTORNEYS

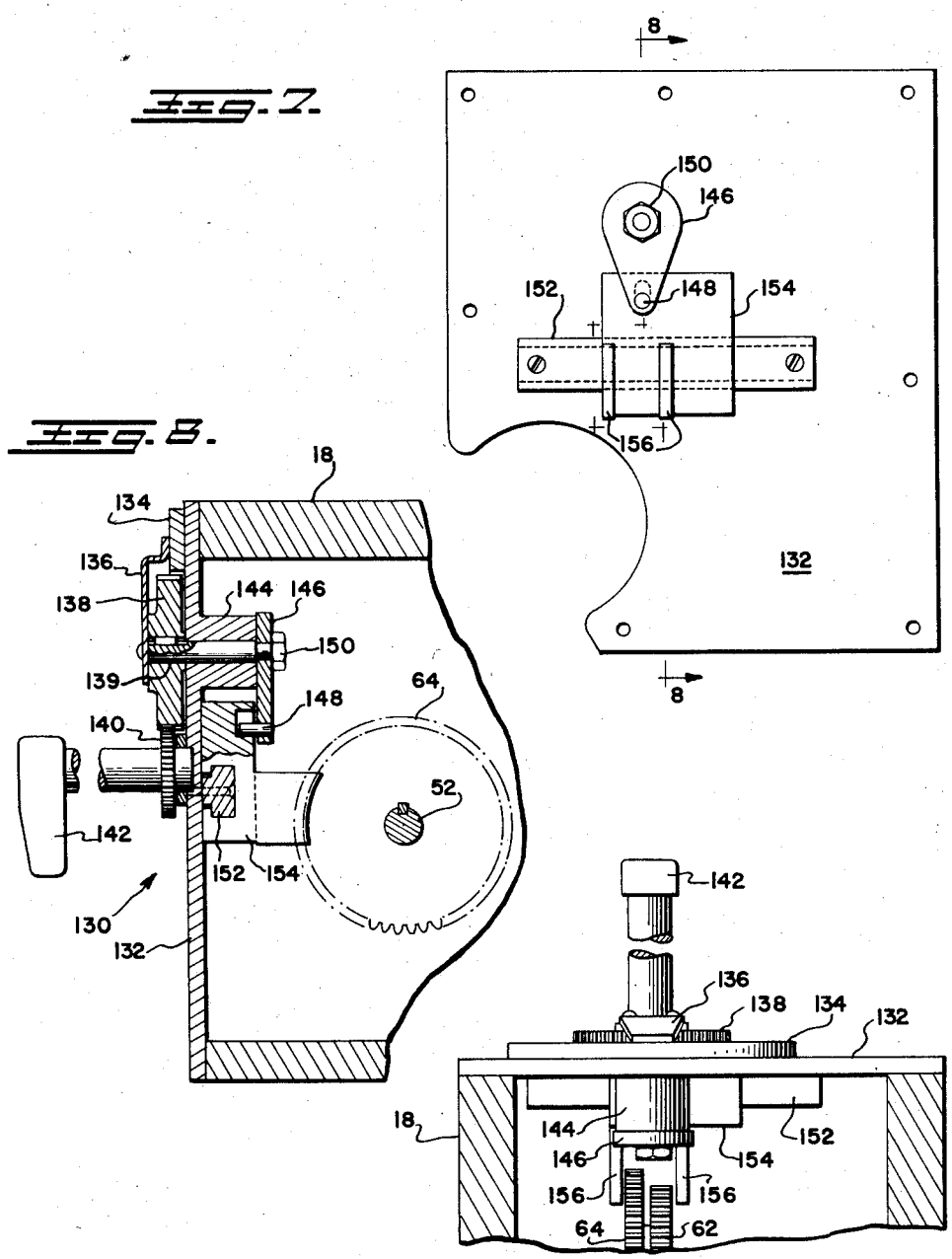

United States Patent Office 2,890,924
Patented June 16, 1959

2,890,924
VARIABLE SPEED DRIVE

Edgar A. Norfolk, Jr., Rockville, Md.

Application August 31, 1955, Serial No. 531,853

8 Claims. (Cl. 346—113)

(Granted under Title 35, U.S. Code (1952), sec. 266)

The invention described herein may be manufactured and used by or for the Government of the United States of America for governmental purposes without the payment of any royalties thereon or therefor.

This invention relates to a sound range recorder and more particularly to a variable speed paper and stylus drive assembly utilized therein for recording ranges of remote objects in water.

The prior art discloses sound range recorders used with echo ranging underwater sound equipment in which impulses received from the sound equipment are graphically recorded or portrayed on movable, sensitized chart paper mounted in the range recorder. The portrayal of such impulses on the paper takes the form of a plurality of equally spaced lines each having a heavy dot or trace which represents the range to a distant object in water. Chart paper motion represents time while displacement across the paper represents range. A scale in yards is provided on the recorder extending parallel with the spaced lines so that the range of the object is directly readable from the chart paper. Obviously, as the range increases or decreases, a line drawn through the series of dots or traces will assume a certain slope so that rate of change of range or speed can be accurately determined from the slope of the line.

Such prior art recorders also included provision for use of different range scales, such as 1500 and 3750 yards. A serious disadvantage of recorders having such range scales is that an accurate determination of range cannot be made when a vessel carrying echo ranging equipment and a recorder approaches an object relatively close by in the water. It is at these short ranges, that is 600 yards or less, where the accuracy of the range is most important. Illustrative of this is the instance where a vessel is operating in an uncharted harbor or mine field. Under these circumstances, accuracy of range at short distances is essential to safe operation of the ship, but currently used recorders do not provide such accurate information since the 1500 yard range scale is too large to give satisfactory readings.

The present invention eliminates this serious deficiency by providing the recorder with an additional scale having a range between zero and 600 yards. This is accomplished by a unique arrangement of gears which respectively drive the chart paper and a stylus at different speeds for recording ranges within a 600 yard area.

It is therefore an object of the invention to provide a recorder having a range scale capable of indicating with accuracy the range of water-borne objects adjacent a vessel.

Another object of the invention is the provision of a novel gearing arrangement for shifting from one range scale to another while driven shafts in the recorder are in a rotating condition.

Still another object of the invention is the provision of a gearing arrangement for driving isolated portions of a driven shaft causing them to rotate at different speeds.

A further object of the invention is the provision of a gearing arrangement for a recorder for achieving speed reduction on a pair of isolated horizontal and vertical shafts to provide variable speeds from a common drive source.

Other objects and many of the attendant advantages of this invention will be readily appreciated as the same becomes better understood by reference to the following detailed description when considered in connection with the accompanying drawings wherein:

Fig. 5 is a view in elevation taken substantially on lines 5—5 of Fig. 4;

Fig. 6 is a view in elevation taken substantially on lines 6—6 of Fig. 4;

Fig. 7 is a view in elevation of the gear box cover plate taken from the inside looking out and showing the gear shift mechanism;

Fig. 8 is a cross-sectional view in elevation taken on lines 8—8 of Fig. 7; and

Fig. 9 is a plan view of the gear box cover plate attached to the gear box and showing the gear shift mechanism engaging a gear in the gearing apparatus.

Figure 1:
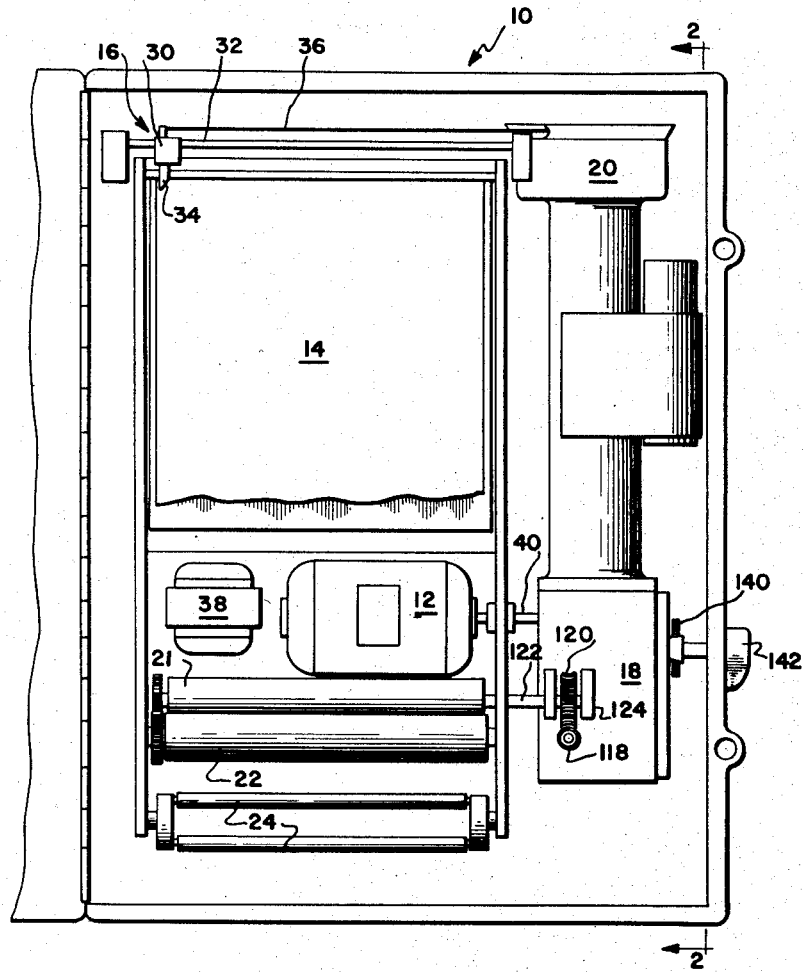
Fig. 1 is a view in elevation with a door of the recorder in an open position, showing the major elements of the invention.
Figure 2:
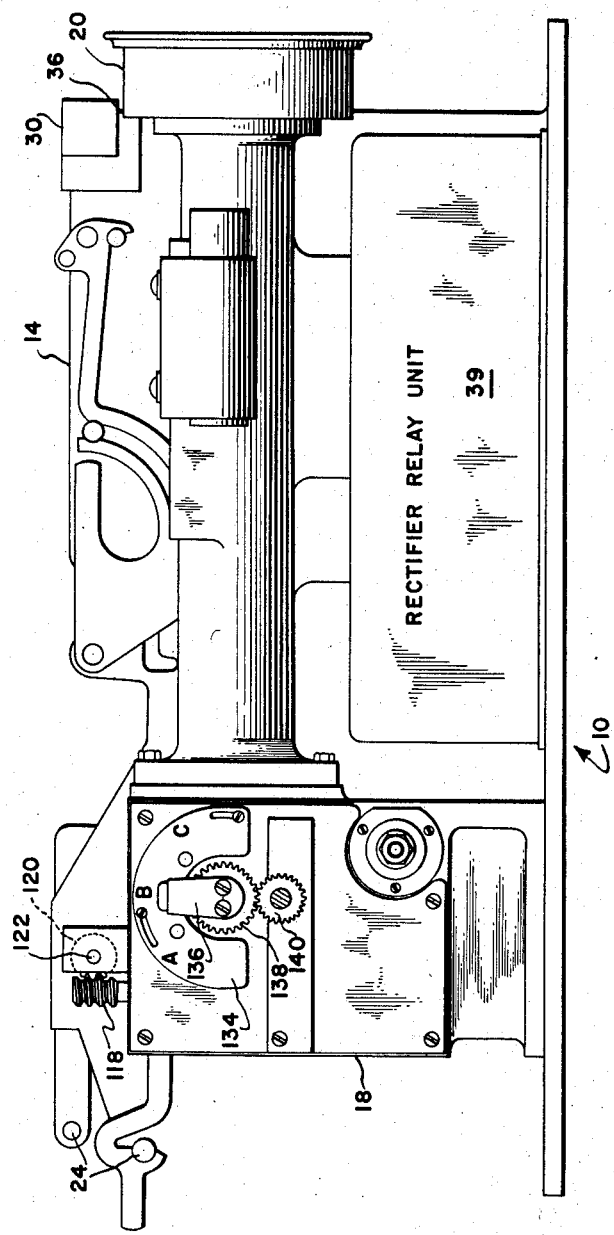
Fig. 2 is a right side view taken on lines 2—2 of Fig. 1 showing the internal mechanism of the range recorder.

Referring now to the drawings wherein like reference characters designate like or corresponding parts throughout the several views, there is shown in Figs. 1 and 2 the general arrangement of parts comprising the recorder. The major elements for obtaining a trace on chart paper for visually determining range to a distant object, are enclosed within a container 10 and comprise, among other elements, a motor 12 which functions as a means for moving chart paper 14 beneath a stylus mechanism 16 and also as a means for moving said stylus transversely of the chart paper. Movement of the chart paper and stylus 34 is obtained by connecting motor 12 to a gear box 18 which respectively transmits motion through a moving chart paper 14 beneath a stylus mechanism 16 and to drive idler rollers 21 and 22 located at positions adjacent the motor. It will be clear from Figs. 1 and 2, that the chart paper moves beneath the stylus prior to being wound on the drive and idler rolls 21 and 22. Reroll mechanism 24 is utilized for rewinding the paper after use.

The stylus mechanism 16 comprises a stylus carriage 30 mounted for reciprocating movement on a guide bar 32, and having stylus 34 extending therefrom for contacting the chart paper as it passes therebeneath. The stylus carriage 30 has a cord 36 extending between the carriage and the magnetic clutch element 20 so that actuation of the clutch element causes the stylus carriage to move across the paper at a predetermined rate of speed.

A transformer 38 and rectifier relay unit 39 are associated with the recorder for keying the transducer of underwater sound equipment (not shown) and for recording on the paper a trace showing the distance of the transducer from a remote underwater object. The above recited elements and the manner in which they coact with one another are well known in the prior art and details of operation have been intentionally omitted since the improvement comprising this invention lies in the gear shift mechanism and the arrangement of gears actuated thereby in gear box 18, as hereinafter described.

Figure 3:
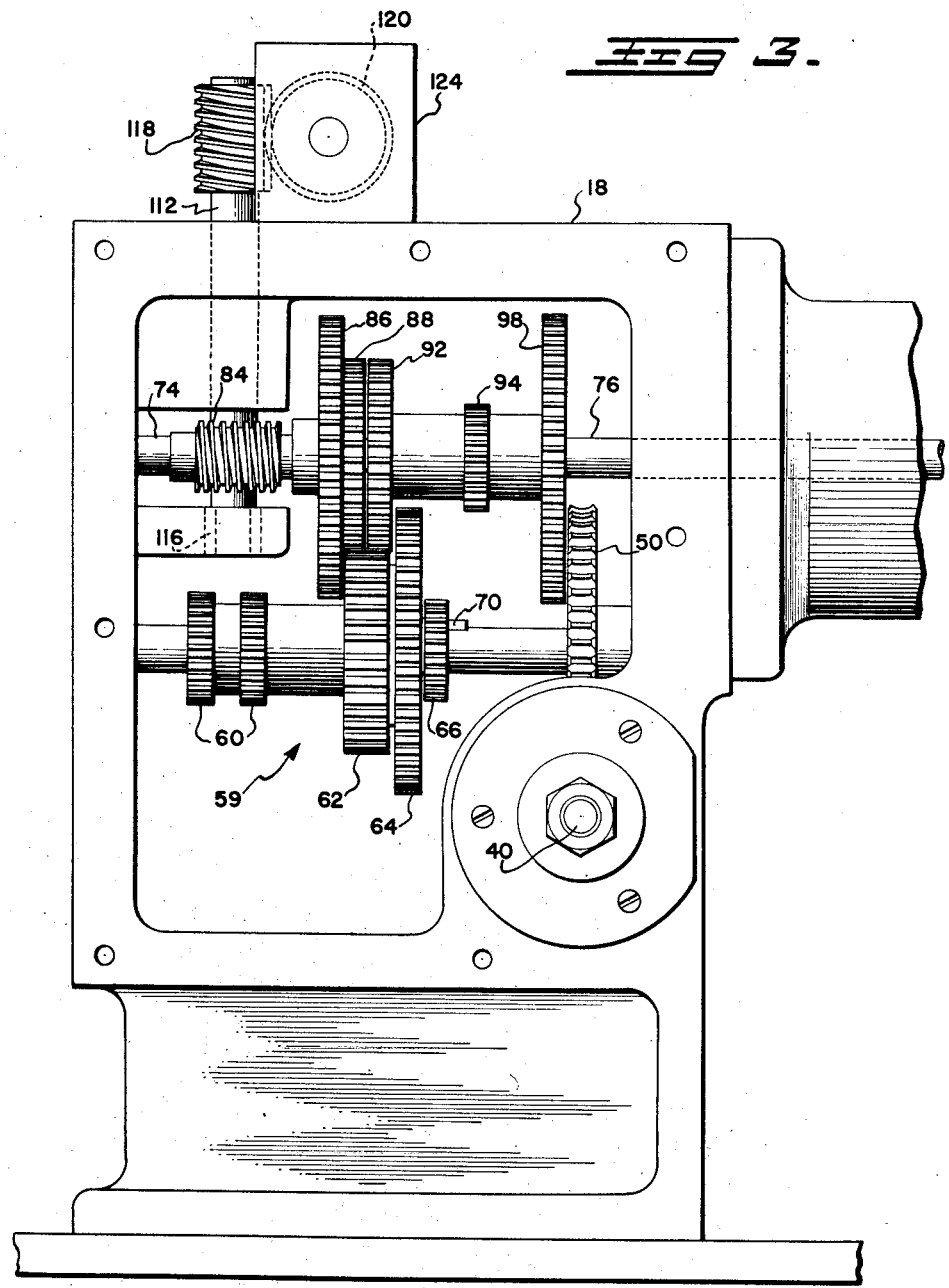
Fig. 3 is a view in elevation of a gear box with the cover plate removed, showing the arrangement of gears when the recorder is operating on a 1500 yard range scale.
Figure 4:
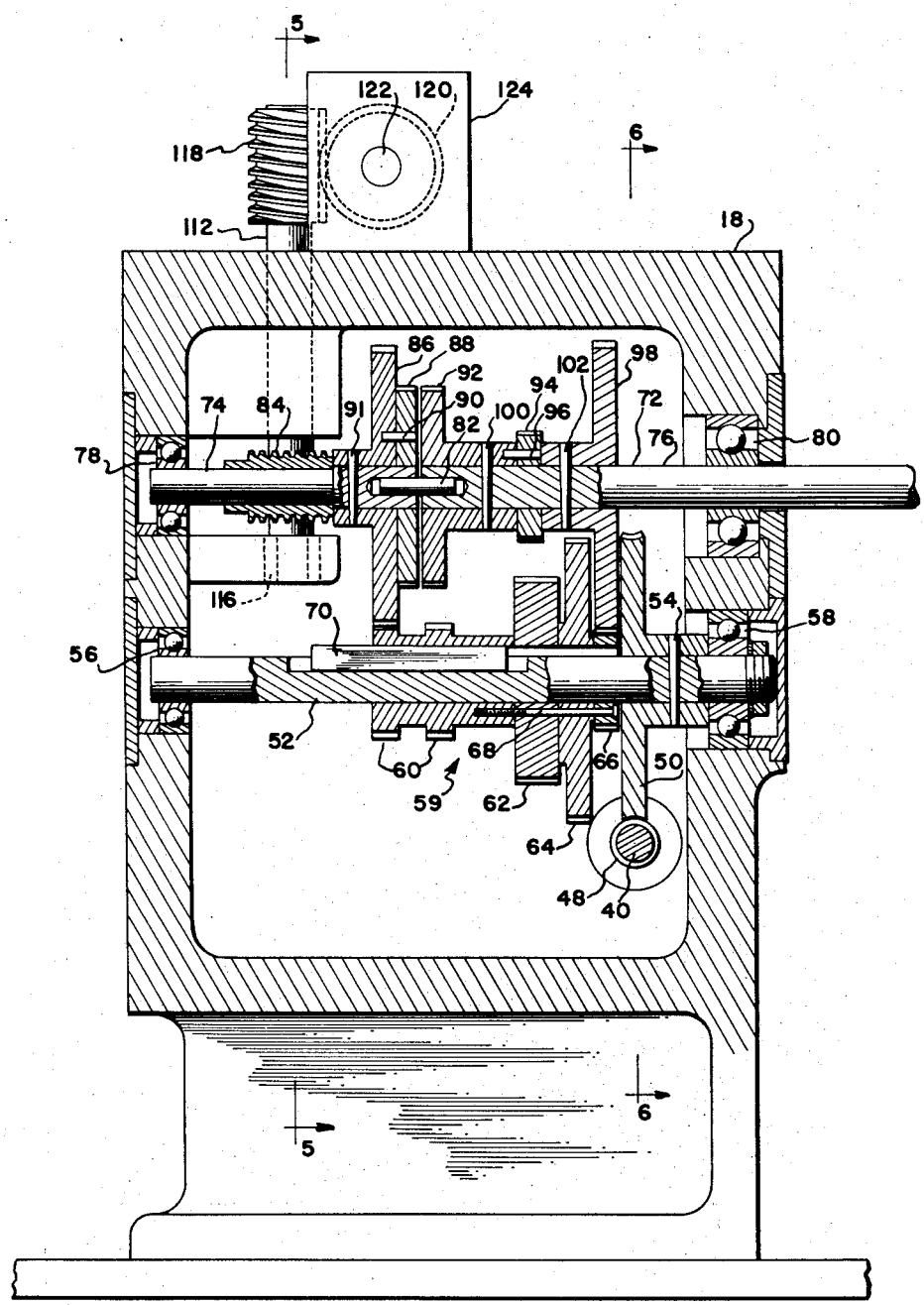
Fig. 4 is a view similar to that of Fig. 3 except that the gears are shifted to a position to have the recorder operate on a 3750 yard range scale.

Referring now to Figs. 3, 4, 5 and 6, in which Figs. 3 and 4 are similar except for a showing of different positions that the gears are capable of assuming. The gear mechanism is housed in gear box 18 and the drive shaft 40 therefor extends from motor 12 and is fixed in the gear box housing by means of bearings 42 and 44; accidental removal of the shaft from the housing being prevented by a lock nut 46. The shaft 40 is provided with a fixed thread worm 48 that is constantly in mesh with a worm gear 50 firmly anchored to shaft 52 by a dowel pin 54. It will be noted that shaft 52 extends transversely of the motor shaft 40 and is supported in the gear box housing by bearings 56 and 58. As shown in Fig. 4, additional gears 60, each having thirty-two teeth, gear 62 having fifty-six teeth, gear 64 having eighty teeth and gear 66 having thirty-two teeth, are all attached to one another and therefore rotate as a single unit along the longitudinal axis of shaft 52. The single unit, hereinafter referred to as a slidable gear unit 59, is formed by passing a bolt 68 through each of the above-mentioned gears and along the axis of the shaft.

In order to transmit movement from motor shaft 40 and gear 50 to the slidable gear unit 59, the shaft 52 and gear unit are each provided with a slot and key arrangement 70 for preventing relative movement therebetween. The purpose of the slidable gear unit is to provide an arrangement of gears capable of meshing with others for transmitting motion to the chart paper 14 and stylus 34. In order to effect movement of the latter, the housing 18 is provided with a shaft 72 positioned parallel with and above the shaft 52. As shown in Fig. 4, the shaft 72 is divided into two parts, 74 and 76, each having an end supported in bearings 78 and 80 respectively fixed in the sides of the gear box housing. The abutting edges of shafts 74 and 76 are placed in alignment with one another by an aligning pin 82 snugly fitted in an opening provided in the end of shaft 76 but adapted to ride free in shaft 74. Shaft 74 is equipped with a six-thread worm 84, and an eighty-toothed gear 86 attached to a fifty-six-toothed gear 88 by means of a dowel pin 90. The gear 86 is held in a fixed position on shaft 74 by an additional pin 91 thereby preventing relative movement therebetween.

Shaft 76 is likewise provided with a fifty-six-toothed gear 92 to which is dowelled a thirty-two-toothed gear 94 by pin 96 and an eighty-toothed gear 98. Pins 100 and 102 respectively anchor gears 92 and 98 to shaft 76. It will be evident that since there is no direct connection between shafts 74 and 76, the gears respectively mounted on each of these shafts will turn at different speeds with respect to one another. The gears mounted on and associated with shaft 74 are referred to as the paper drive portion of the mechanism while those attached to and associated with shaft 76 are called the clutch drive portion.

In order to show the transmission of motion from shaft 74 to the paper drive mechanism, reference is now made to Figs. 1, 3, 4, and 5. Worm 84 is permanently engaged with a gear 110 fixed to vertical shaft 112 mounted in bearings 114 and 116 in the gear box housing. The upper end of shaft 112 is provided with a six-thread worm 118 adapted for meshing with a worm wheel 120 mounted on shaft 122 of drive roller 21, the latter being shown in Fig. 1. Bearing surfaces for shaft 122 are provided by a pair of upstanding lugs 124 permanently fixed to the top of the gear box housing.

Referring now to Figs. 2, 7, 8 and 9 there is shown a gear shift mechanism 130 mounted on cover plate 132 closing an accessible opening in gear housing 18. As aforementioned, the purpose of the gear shift mechanism is to move the slidable gear unit 59 to various positions on shaft 52 for engaging mating gears on shafts 74 and 76 for obtaining variations in chart paper and stylus speeds. Looking at the exposed side of the cover plate on the gear box, the gear mechanism comprises a removably mounted plate 134 provided with 3 detents, A, B and C respectively, for representing the various ranges on which the recorder is adapted to operate; namely 1500, 600 and 3750 yards. Each of these detents A, B and C, is adapted for engagement by a click plate 136 supported on gear 138 having a shaft 139 extending through the cover plate. Gear 138 meshes with a second gear 140 provided with a range selector knob 142 extending outwardly from the cover plate.

Referring now to the gear box side of cover plate 132, the shaft 139 bears in a spacer 144. An actuating plate 146 having a protruding dog 148 is firmly anchored to the spacer by means of nut 150 attached to the inner side of shaft 139. A rail 152 is affixed to the inner side of cover plate 132 and is designed in such fashion as to receive a carriage 154 which is caused to reciprocate thereon by the engaging action of dog 148 fitted in an opening provided in the carriage when knob 142 is turned in one direction or the other. The carriage 154 is equipped with a pair of forked levers 156 which straddle gears 62 and 64 comprising a part of the slidable gear unit 59.

It will be evident that upon movement of range selector knob 142 to positions A, B or C, motion will be transmitted through the gears 140 and 138 to actuating plate 146, which in turn moves carriage 154 either to the left or right, thus carrying with it the slidable gear unit 59 to effect meshing of the proper gears for the corresponding range scale selected.

*Operation*

As aforementioned, the recorder is provided with 3 range scales, namely 1500, 600 and 3750 yards, respectively indicated as A, B and C on the plate 134. When the range selector knob 142 is set to the A position, 1500 yard range scale, the slidable gear unit 59 assumes the position shown in Fig. 3. In such position, rotary motion is transmitted from motor shaft 40, worm 48 and worm gear 50 through fifty-six-toothed gear 62 which imparts movement to fifty-six-toothed gears 88 and 92. Since each of these gears respectively rotate shafts 74 and 76, it will be evident that the latter will revolve at the same speeds, namely 25 r.p.m., thereby causing the chart paper to move at a uniform rate of speed with respect to movement of the stylus across the paper. The accurate translation of speed from shafts 74 and 76 to the chart paper and stylus is obtained by virtue of the design of the worms 84 and 118 and worm gear 120 in the paper drive portion of the mechanism; and in the design of the magnetic clutch and stylus mechanism in the clutch drive portion of the device. The movement of the chart paper represents time while the displacement of the stylus represents range; therefore the coacting effort of these two elements performs a time-range plotting function making it possible to readily observe the range rate of an object on the chart paper.

When it is desired to shift to a longer range, range selector knob 142 is placed in the C position, thereby moving the slidable gear unit to the position shown in Fig. 4. It will be noted that thirty-two-toothed gears 60 and 66 engage eighty-toothed gears 86 and 98 for respectively moving the shafts 74 and 76 at the same speed, in this instance, 10 r.p.m. As in the previous example, the chart paper and stylus again move at the same speed with respect to one another, thereby achieving a time-range plot of a remote object.

In the event the 600 yard range scale is used, then the range selector knob is placed in the B position, causing the right side of gear 60 to engage gear 86 and gear 64 to engage gear 94. These gear ratios are such that the shaft 74 in the paper drive portion is caused to move at 10 r.p.m while shaft 76 in the clutch drive portion moves at 62½ r.p.m. These speeds are directly reflected in the speed of chart paper and stylus movement in obtaining a plot of the distant object.

Obviously many modifications and varitions are possible in light of the above teachings. For example, additional gearing ratios could be added for obtaining additional time-range plotting functions. If it were unnecessary to maintain the gear case dust-free, gear 50 could be replaced by a rack-gear. By using larger gears and various gear ratios the principle of providing reduced speed on both the horizontal and vertical shafts could be extended for many uses. It is within the scope of this invention to substitute bearings for the bearing member 82 in shafts 74 and 76 in the event strengthening of shaft 72 were necessary. Either A.C. or D.C. motors having more than one constant speed could provide additional output speeds from the reduction mechanism. It is therefore to be understood that within the scope of the appended claims, the invention may be practiced otherwise than as specifically described.

What is claimed is:

1. A device for recording ranges of a remote object comprising a power source, gearing apparatus connecting said power source with a chart paper mechanism for moving paper mounted thereon at predetermined speeds, clutch means connecting said power source through said gearing apparatus to a stylus mechanism including a movable stylus coacting with said paper whereby a time-range plot of said object is caused to be traced on said paper, said gearing apparatus comprising a housing, a first gear assembly slidably mounted on a driving shaft in said housing, a driven shaft means in said housing comprising a pair of driven shafts adapted for relative rotation with respect to one another, a second and third gear assembly respectively mounted on said pair of driven shafts adapted for simultaneous engagement by said first gear assembly so as to selectively rotate said driven shafts at the same or different speeds, means respectively connecting said driven shafts with said chart paper and stylus mechanisms, whereby said first gear assembly transmits motion through said second and third gear assemblies to the respective chart paper and stylus mechanisms for moving said chart paper and stylus at the same or different speeds relative to one another, and gear shift means associated with said first gear assembly for moving the latter to any one of a plurality of positions.

2. A device for recording ranges of a remote object comprising a power source, gearing apparatus connecting said power source with a chart paper mechanism for moving paper mounted thereon at predetermined speeds, clutch means connecting said power source through said gearing apparatus to a stylus mechanism including a movable stylus coacting with said paper whereby a time-range plot of said object is caused to be traced on said paper, said gearing apparatus comprising a housing, a first gear assembly comprising stepped gears slidably mounted on a driving shaft in said housing, a second gear assembly including a pair of driven shafts disposed along a common axis, and each being provided with stepped gears adapted for simultaneous engagement with said first gear assembly thereby causing said driven shafts to rotate at speeds corresponding to the gears in mesh in said first and second gear assemblies, and gear shift means on said housing engaging said first gear assembly for selectively moving the latter into meshing engagement with selected gears in said second gear assembly.

3. A device for recording ranges of a remote object comprising a power source, gearing apparatus connecting said power source with a chart paper mechanism for moving paper mounted thereon at predetermined speeds, clutch means connecting said power source through said gearing apparatus to a stylus mechanism including a movable stylus coacting with said paper whereby a time-range plot of said object is caused to be traced on said paper, said gearing apparatus comprising a driving shaft mounting a slidable gear unit including stepped gears of different diameters, a pair of driven shafts lying along a common axis in said housing, stepped gears of different diameters on each of said shafts adapted for simultaneous meshing with the stepped gears on said slidable gear unit, and a gear shift mechanism associated with said slidable gear unit for selectively moving the stepped gears of the latter into meshing engagement with selected gears on said pair of driven shafts thereby causing the latter to rotate at the same or different speeds according to the gears of different diameters thereon meshing with the stepped gears of said slidable gear unit.

4. A device for recording ranges of a remote object comprising a power source, gearing apparatus connecting said power source with a chart paper mechanism for moving paper mounted thereon at predetermined speeds, clutch means connecting said power source through said gearing apparatus to a stylus mechanism including a movable stylus coacting with said paper whereby a time-range plot of said object is caused to be traced on said paper, said gearing apparatus comprising a pair of driven shafts placed in end to end relationship and each having a plurality of stepped gears of varying diameter fixedly mounted thereon, means connecting one of said shafts to said chart paper mechanism and the other to said stylus mechanism, a driving shaft in said housing spaced in parallel relationship with said pair of driven shafts and supporting a slidable gear unit rotatable with said driving shaft, said slidable gear unit comprising a cylindrical member having a plurality of spaced gear wheels around its periphery, said last named gear wheels being stepped and spaced a distance to mesh with the gear wheels on said pair of shafts in any one of a number of positions for causing said pair of shafts to rotate at the same or different speeds with respect to one another, and a gear shift mechanism associated with said slidable gear unit for moving the latter into any one of said positions.

5. The combination according to claim 4 wherein said pair of shafts lie on a common axis and are pinned at adjacent ends for providing relative rotation with respect to one another.

6. The combination according to claim 4 wherein one of said stepped gear wheels on said slidable gear unit is adapted to mesh with a stepped gear wheel on each of said pair of shafts for rotating the latter at the same speeds.

7. A geared power transmission comprising a housing, a first shaft in said housing, a power input means connected to said first shaft, a first gear assembly comprising a plurality of stepped gears, said gear assembly being slidably mounted on said first shaft, a second gear assembly including second and third shafts disposed along a common axis, and each being provided with stepped gears adapted for simultaneous engagement with said first gear assembly, thereby causing said second and third shafts to rotate at speeds corresponding to the gears in mesh in said first and second gear assemblies, and gear shift means on said housing engaging said first gear assembly for selectively moving the latter into meshing engagement with selected gears in said second gear assembly, whereby said second and third shafts may be caused to rotate at the same or different speeds relative to one another.

8. A geared power transmission as set forth in claim 7, wherein one of the slidably mounted stepped gears, on said first shaft, is adapted to simultaneously mesh with a stepped gear on both said second and third shafts for rotating the latter shafts at the same speeds.

References Cited in the file of this patent

UNITED STATES PATENTS

| | | |
|---|---|---|
| 1,865,022 | Larson | June 28, 1932 |
| 2,084,887 | Bennett | June 22, 1937 |
| 2,158,320 | Bock | May 16, 1939 |
| 2,212,085 | Tate | Aug. 20, 1940 |
| 2,309,956 | Hughes | Feb. 2, 1943 |
| 2,654,267 | Schmitter | Oct. 6, 1953 |
| 2,722,470 | Witt | Nov. 1, 1955 |

FOREIGN PATENTS

| | | |
|---|---|---|
| 874,372 | Germany | Apr. 23, 1953 |